United States Patent [19]
Benton et al.

[11] Patent Number: 4,960,981
[45] Date of Patent: Oct. 2, 1990

[54] METHOD OF AND SYSTEM FOR ELECTRONIC FUNDS TRANSFER VIA FACSIMILE MACHINES

[75] Inventors: William M. Benton, Fort Lauderdale; William Mee, Pompano Beach, both of Fla.

[73] Assignee: Moneyfax, Inc., Ft. Lauderdale, Fla.

[21] Appl. No.: 298,348

[22] Filed: Jan. 17, 1989

[51] Int. Cl.⁵ ............................................. G06F 15/30
[52] U.S. Cl. .................................... 235/379; 902/40; 364/408
[58] Field of Search .......................... 235/379; 902/40; 364/408

[56] References Cited
U.S. PATENT DOCUMENTS
4,264,808  4/1981  Owens .................................... 902/40

Primary Examiner—Harold I. Pitts
Attorney, Agent, or Firm—Lowe, Price, LeBlanc, Becker & Shur

[57] ABSTRACT

In a system for carrying out financial transactions via facsimile machines, account customized transaction vouchers are completed by the parties to a transaction, each filling in the amount of the transactions, whether he or she is a sender or receiver of fund, the accound number of the other party and signature. The voucher optionally contains a transparent pocket for receiving an identification card of an authorized user of the system, and each party transmits by facsimile an image of the completed voucher together with identification card to a facsimile machine at a central facility, such as an automated clearing house ACH). A character reader at the central facility reads the incoming data and authorizes the requested transaction based on personal identification numbers correctly transmitted to the centrual facility via telephone pushbotton switches and an adequate account balance. Upon audible confirmation of the transaction information by the central facility using a synthesized voice message over the telephones, and confirmation by the parties, the central facility clears the transaction and sends transaction reports to the parties by facsimile.

19 Claims, 15 Drawing Sheets

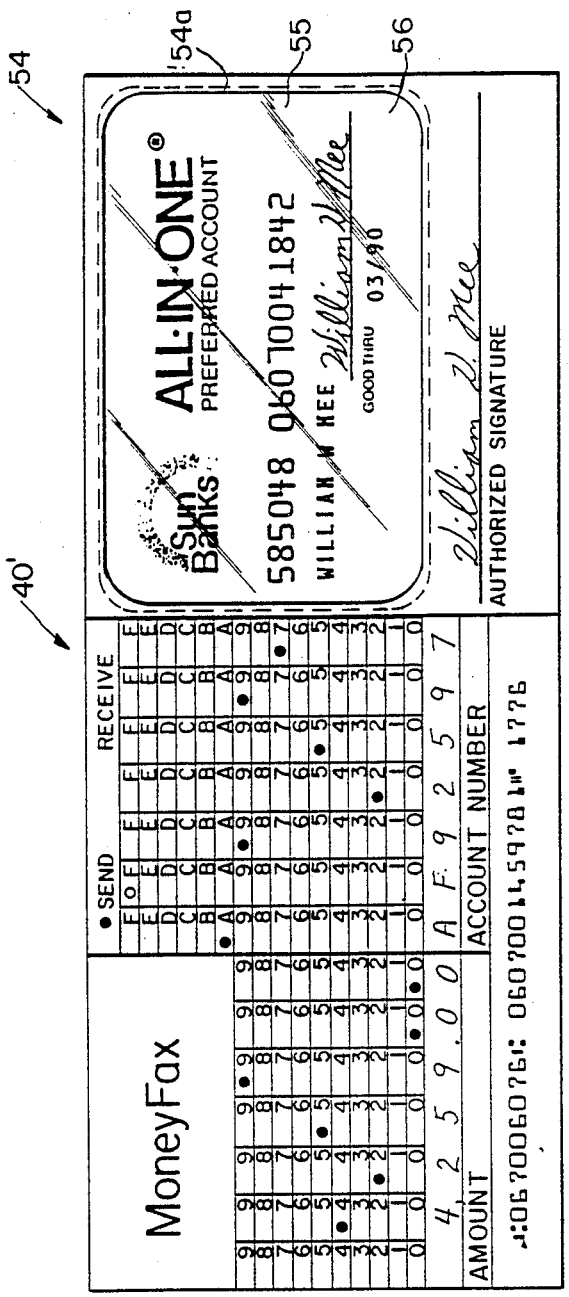
FIG. 3
FIG. 4

METHOD OF AND SYSTEM FOR ELECTRONIC FUNDS TRANSFER VIA FACSIMILE MACHINES

TECHNICAL FIELD

This invention relates generally to electronic funds transfer systems, and more particularly to a unique on-line electronic funds transfer system incorporating facsimile machines to transfer electronic funds data of buyers and sellers located at common or remote points of sale for clearance by an automated clearing house (ACH) or other facility.

BACKGROUND ART

Spurred by the pressures of paper-based checking which is costly and time consuming for financial institutions and further in light of the inconvenience of maintaining accurate accounting in cash transactions, institutions have sought out and experimented with various electronic means of extending and speeding up account accessibility. To this end and to improve record keeping as well as to reduce flow of actual cash, computer technology has been applied to develop electronic funds transfer, which essentially is a process of value exchange achieved through electronic devices. Examples of electronic funds transfer equipment that have become used on a substantial basis in recent years are the Automated Clearing House (ACH), the Automated Teller Machine (ATM) and the point of sale system (POS).

To eliminate the presence of a central computer in every transaction, there has been a trend toward off-line electronic funds transfer, that is, transfer of data between portable and resident units, with only periodic downloading of data to a central computer. In Mareno U.S. Pat No. 4,007,355, for example, cashless transactions are made between credit cards through a special interface located at each vendor station. Stuckert U.S. Pat. No. 4,277,837 is directed toward a cashless, off-line transaction system involving portable units that are carried by customers and adapted for use with data storage and transfer cards.

The Mareno and Stuckert systems have particular problems that have limited their widespread use in off-line electric funds transfer. In Mareno, no exchange of funds may be made arbitrarily because the cards carried by each user, although having funds data storage capability, have no keyboards and require a special interface apparatus to be present at each transaction. In Stuckert, cards used with the portable terminals have no display; a separate portable terminal must be involved during each transaction. The user cannot continuously monitor his account, limiting the versatility of the system.

These problems and others were solved by Benton in U.S. Pat. No. 4,305,059 issued on Dec. 8, 1981, disclosing a modular funds transfer system wherein each user as well as vendor carries an identical portable module having a keyboard and a display Funds are transferred between modules using a hard wire interface, and the account status stored in each module is updated following each transaction. In another patent to Benton U.S. Pat. No. 4,341,951, printed vouchers are issued by the portable module following each transaction.

The Benton approach was further refined in U.S. Pat. No. 4,454,414 to provide bidirectional optical coupling between portable funds data transfer modules, including a "hand-shaking" protocol that enables funds transfer to be completed only if a number of criteria are satisfied. These criteria include an identification check following keyboard entry by the user of a secret number and examination of the transaction amount to ensure that it falls within.

Finally, in Benton et al. U.S. Pat. No. 4,625,276, electronic funds data are transferred between portable modules either directly in a local mode of operation or indirectly, via telephone lines, in a remote mode of operation Transaction records are printed by an outboard printer or downloaded to a central computer.

The systems described in the aforementioned Benton et al. patents are capable of having a substantial impact on the manner by which financial transactions are carried out, securely transferring funds between buyers and sellers while simultaneously printing supporting documents. However, considerable dedicated apparatus including a modem and printer as well as portable modules are required to implement these systems The present invention provides on-line electronic funds transfer in a manner to reduce the cost of implementation, and to improve availability, of the system to the parties of a transaction.

There currently are more than two million facsimile machines throughout the world, used exclusively for the transfer of documentary information between individual stations connected to any dial up telephone line. Such machines, with printer and keypad as well as a modem, are capable of transmitting and receiving graphical data, e.g., bit mapped images as well as textual data In copending application Ser. No. 236,614 to Benton et al., filed Aug. 23, 1988, there is described a modification to and implementation of a conventional facsimile machine to be operative in a transaction mode of operation for carrying out transactions between buyers and sellers. The Benton et al. system in '614 incorporates a keyboard in the facsimile machine together with special identification modules each containing an integrated circuit memory storing account data, and, in graphical form, the signature of an authorized user During transactions, the facsimile machine transmits ASCII characters corresponding to keyboard entered transaction data such as the amount of the transaction together with account and signature data to another facsimile machine similarly configured and containing the identification module of the other party to the transaction. Following agreement between the parties, funds are exchanged, the integrated circuit memories in the identification modules are updated by the amount of the transaction, and the facsimile machines print transaction records including the signatures of the parties Occasionally, the contents of the identification cards are downloaded to a central computer at an automated clearing house (ACH) for account updating.

While generally satisfactory, the Benton et al system just described requires modification of existing facsimile machines to interface with the integrated circuit memory modules carried by authorized users. System implementation would be substantially simplified if electronic funds transfer could be carried out through conventional, unmodified facsimile machines It would also be preferable to clear transactions at the ACH in real time, on line, in a manner consistent with existing funds transfer protocols.

DISCLOSURE OF THE INVENTION

Accordingly, one object of the invention is to provide a method of and system for carrying out electronic funds transfer, via conventional, unmodified facsimile machines.

Another object of the invention is to provide a method of and system for electronic funds transfer, via facsimile machines, using existing electronic funds transfer protocol.

A further object of the invention is to provide on-line electronic funds transfer, via facsimile machines, in real time.

A still further object is to provide electronic funds transfer via facsimile machines that is easily implemented and requires no additional, or modification of existing, equipment.

The above and other objects are satisfied, in accordance with one aspect of the invention, by facsimile machines located at the sites of the parties to a transaction, e.g , buyer and seller. Each facsimile machine is conventional, including a document reader for optically reading and image bit map encoding contents of a document to be transmitted, a modem for transmitting the bit mapped image to a facsimile machine located at or near a central facility, which in the preferred embodiment comprises an automated clearing house (ACH), and for receiving incoming images thereto, and a document printer.

The system further includes special transaction vouchers to be sent by facsimile by the buyer and seller to the ACH for clearing. Each voucher has particular regions containing pre-printed information such as the account number of the holder, ACH routing number and unique sequential numeric designator, similar to a bank check, and another region to be filled in for each transaction including the amount of the transaction, the account number of the other party to the transaction and the written signature of the holder.

In accordance with another aspect of the invention, identification cards carried by the parties include an account number and the identification of a user authorized to carry out transactions. The written signature of the authorized account holder, together with account number and name of the sponsoring bank or other financial institution, is also on the card A further region of the voucher, preferably comprising a transparent pocket, may be provided for receiving the identification card of the account holder.

A character reader associated with the facsimile machine at or near the ACH reads the various regions of the images of the transaction vouchers received by facsimile, formats the images into data recognizable by the ACH and supplies the data to the ACH for transaction clearing. A voice synthesizer at the ACH is responsive to incoming transaction data for transmitting voice messages to the parties. For example, the parties may receive, via telephone, synthesized voice messages confirming the amount of the transactions and the identities of the parties. In addition, the facility detects errors in the incoming transaction data, such as an incomplete voucher, and controls the voice synthesizer to transmit appropriate voice error messages to the parties.

In accordance with still another aspect of the invention, the ACH further stores personal identification numbers (PINs) of parties authorized to carry out financial transactions, and compares the personal identification number provided by each party with the stored personal identification numbers to determine whether the parties are authorized to transact within the system. Also stored are account data associated with parties authorized to carry out financial transactions. The ACH compares the amount of each requested transaction with the stored account data to determined whether a requested transaction is authorized. The transaction, if authorized, is cleared the next day ("next day" transfer).

In accordance with another aspect of the invention, the ACH sends to the parties, via facsimile, printed reports providing transaction summaries A first report, following confirmation by the parties that a requested transaction should be carried out, summarizes the details of the pending transaction. Another report is sent to the parties that in effect is a hard copy invoice of the transaction. From time to time, the ACH also sends by facsimile to all authorized users of the system a summary of their account activity.

In another embodiment of the invention, funds transfer is carried out between banks directly, without an intervening ACH. This embodiment is similar to the one described above, with the ACH replaced by a transaction processing center, such as an ABA ENTREE system, for immediate, rather than "next day", funds transfer.

Still other objects and advantages of the present intervention will become readily apparent to those skilled in this art from the following detailed description, wherein only the preferred embodiment of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF THE DRAWINGS

FIGS. 2(a) and 2(b) are diagrams of one embodiment of a transaction voucher used in the system of this invention and filled out respectively by the payor and payee to a transaction.

FIG. 3 is a diagram of another embodiment of the voucher with an identification card seated in a transparent pocket provided and completed by a party to the transaction receiving funds.

FIG. 4 is a diagram of an identification card carried by an authorized user and adapted to be seated in the pocket part of the voucher shown in FIG. 3.

BEST MODE FOR CARRYING OUT THE INVENTION

Figure 1:
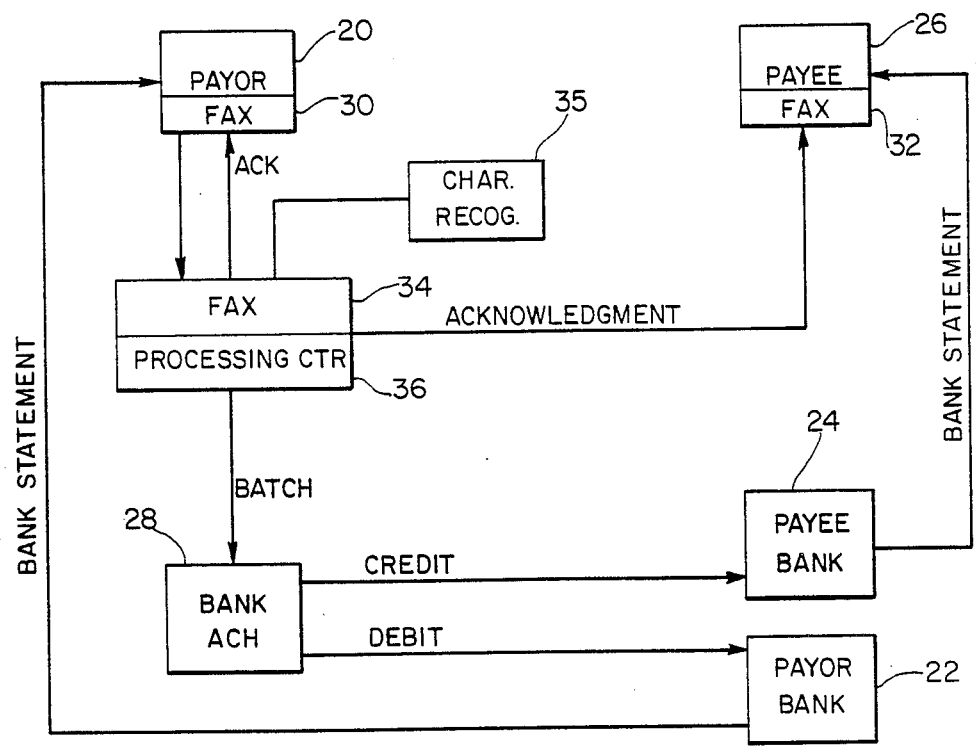
FIG. 1 is a block diagram showing on-line electronic funds transfer with ACH clearing incorporating the principles of the invention.

Referring to FIG. 1, as an overview of funds transfer between parties in an automated clearing house (ACH) network, a payor 20 will transfer funds from an account in his bank 22 to the account of a payee 26 in payee's bank 24. As an intermediary between the banks 22 and 24 there is an automated clearing house (ACH) 28, which is an association of banks arranged to carry paperless exchanges including posting and clearing transactions, such as direct deposits, preauthorized bill payments, customer initiated entries, corporate transfers and the like. This type of network, being well known in the art since 1972, is not described in further detail herein The invention to be described in detail hereinafter implements electronic funds transfer using "remote" facsimile machines 30, 32 at the sites of the payor 20 and payee 26 to transmit images of special transaction vouchers to a "local" facsimile machine 34 at a central facility 36 preferably at or near the ACH 28.

The central facility 36 uses conventional character recognition equipment 35 to separate text from the incoming voucher image and to encode the text into the proper protocol for processing by the ACH 28. The ACH 28 in turn determines whether the parties are authorized to carry out the transaction, depending upon transmission to the ACH by the parties of correct personal identification numbers, and upon confirmation of an adequate balance in the payor's account to support the transfer of funds requested Of particular importance, written transaction receipts or summaries are sent by the ACH to the parties for confirmation via facsimile.

Facsimiles 30, 32 and 34 are conventional machines capable of CCITT, group III or greater, image transmission. Such facsimile machines, being well known, are not described in detail herein. However, it is helpful, by way of review, to note that conventionally a facsimile machine contains all the necessary electronic capability to function as a "front-end" processor for a centralized automated computation and clearing network as required by the present invention. This capability includes a printer to generate hard copy printout, a document reader having an optical scanner to optically digitize documentary material, a modem to transfer to a communication medium, e.g., telephone lines, binary data at a high baud rate, and a telephone line interface including a dialer to generate DTMF dialing tones and process voice communications. It is important to note, that rather than transmitting the ASCII character representation of documentary material, facsimile machines send the actual document image as a binary encoded, "bit mapped" stream of data. The character recognition equipment 35 at the central facility 36 utilizes a computational algorithm to recognize and reconstruct the textual content of digitized image data, in a manner that is well known to persons skilled in the art.

An important aspect of the invention is a specially drafted transaction voucher 40, 40', shown in the embodiments of FIGS. 2 and 3, which contains, in a machine readable format, the complete set of information necessary to characterize and clear a transaction. This transaction voucher 40, 40' is a hybrid of a check, credit card voucher and a certified money order. Voucher 40, 40' is customized and preprinted for an individual account, similar to a check, and contains a facsimile signature of the authorized account holder similar to a credit card as well as a place to be countersigned. The transaction amount and the payee account number are entered both in character form and redundantly in encoded form to enhance machine readability. Each voucher 40, 40, contains a field with ACH routing information as well as a unique sequential numeric designator to prevent reuse of the same voucher.

Figures 2A, 2B:
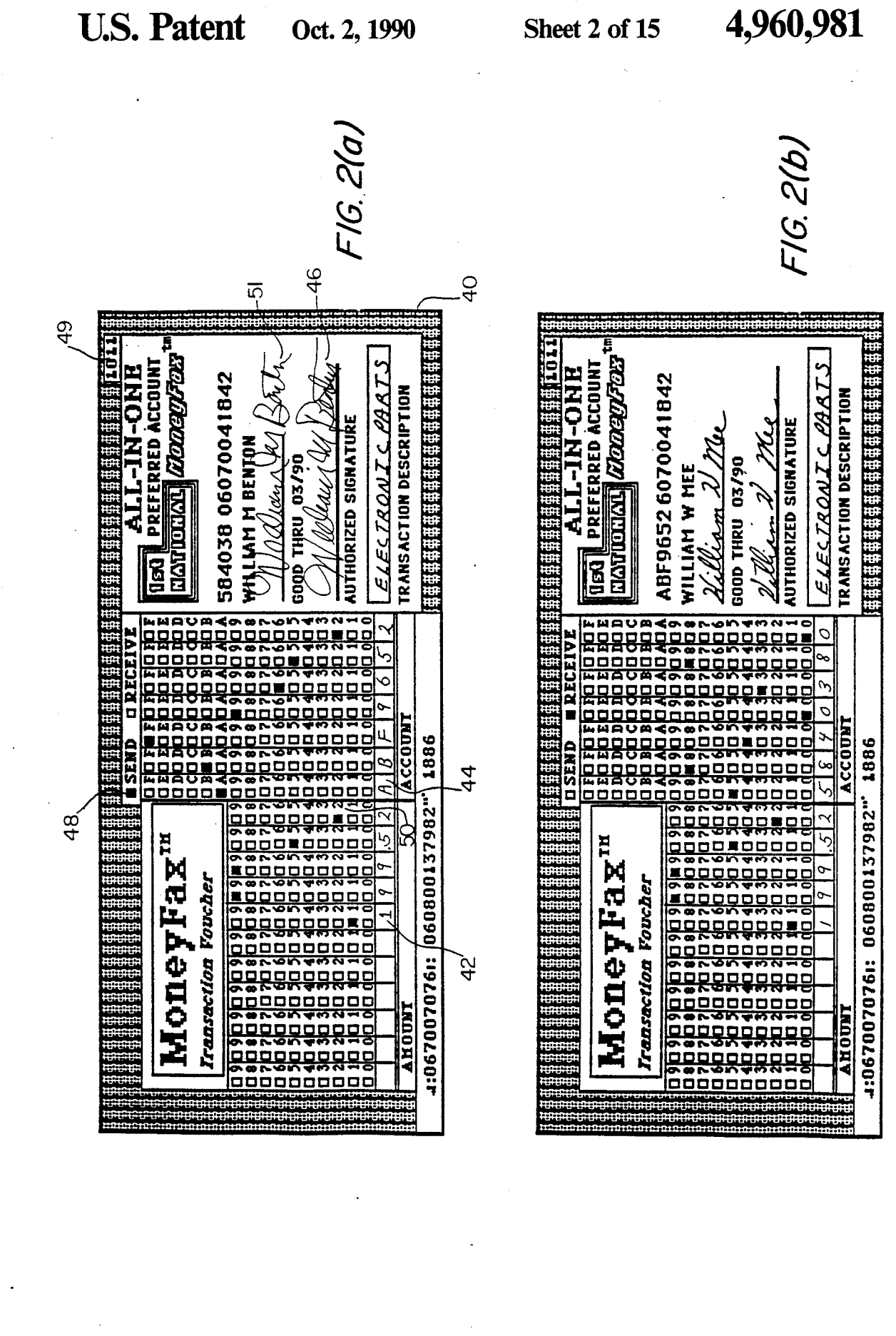

Referring to FIGS. 2a, b, one embodiment of voucher 40, 40', designated as 40, contains a first region for receiving handwritten entries by one party to a transaction, e.g., the payor (also herein referred to as "buyer"). The first region preferably contains a first field 42 for receiving, by handwritten entry, the amount of a transaction, and a second field 44 for receiving, by handwritten entry, the account number of the other party to the transaction, e.g., the payee (seller). Another field 46 receives the handwritten signature of the first party, and field 48 receives a blackened mark indicating whether the first party is sending or receiving funds, that is, whether he is a payor (buyer) or a payee (seller) in this transaction. In FIG. 2a, the voucher 40 by way of example is filled out on behalf of a payor, and the account number of the payee is in location 44; in FIG. 2b, the voucher is filled out on behalf of the payee with field 44 containing the account number of the payor.

Another field 50 within the first region of the voucher 40 receives a series of blackened marks, filled out by the first party, indicating the amount of the transaction; this amount corresponds to the amount handwritten into field 42 of the voucher. There also are the user's account number and ACH routing number pre-printed in voucher field 51 as shown.

The purpose of voucher field 50, receiving blackened marks replicating the handwritten amount of transaction in region 42, is for redundancy; field 42 will be read by character recognition circuitry in unit 35 whereas field 50 will be decoded in a conventional manner by decoder circuitry therein Both types of circuitry are conventional. The amounts read from the two fields 42, 50 must correspond to each other to enable the amount of the transaction to be confirmed.

Another region of the voucher 40, which is pre-printed, includes a field 49 containing a sequence number of the voucher, similar to a check, and another field 53 containing the handwritten signature of the authorized user. This enables the pre-printed and original signatures of the authorized user of the network to be visually compared.

Another embodiment of voucher 40, 40' shown in FIG. 3, identified as 40, contains a further region 54 consisting of a transparent pocket part 55 for receiving an identification card 56 (see FIG. 3b) which contains the name and account number of the authorized user, together with a copy of his signature and the identification of the sponsoring institution (bank). The identification card 56, when inserted into the pocket part 55 of voucher 40', positions the signature field of the card directly above the signature field 46 of the voucher, so that the two can be compared visually. The card 56, together with voucher 40', presents a pair of images that together will be transmitted as a composite image, via facsimile, between the parties to the transaction 20, 26 and the ACH 28 for clearance.

The operation of the system of FIG. 1, using the vouchers 40, 40' and identification card 56 shown in FIGS. 2-4 shall now be considered in overview. By way of example, a transaction between payor and payee using the voucher 40, shown in FIG. 3 is described. During a telephone conversation, assume that an authorized account holder in business A agrees to pay a similarly authorized account holder in business B an amount of $4,259.00. Party A and party B verbally exchange seven-digit account numbers. The account number consists of a seven-digit hexadecimal number, although other conventions can be used. Party A (payor) fills out transaction voucher 40' in the amount of $4,259 and the account number of party B (payee), as shown in voucher fields 42, 44 (FIG. 3). The blank space to the left of each account number and amount in field 50 is darkened, as shown. Party A as buyer checks the "send" designator at the top of the voucher, and inserts his authenticated plastic identification card 56, issued to him, into the clear plastic pocket 55 of the transaction voucher, and signs the voucher on the line labelled "signature". The card 56 is personalized and issued in single quantity only to the assigned individual of party A. Party B fills out a similar pre-printed voucher 40', but checks off the box "receive" Party B then fills in the voucher with the account number of party A.

Party A now places his completed voucher 40' into the document reader of his facsimile machine 30, enters the telephone number of the local computer at 36, and initiates a facsimile transmission to the ACH. Alternatively, the telephone number to the ACH may be pre-stored into the memory of the facsimile machine 30, making it unnecessary for the payor at site 20 to enter the telephone number.

Facsimile machine 30 of party A (payor) goes on-line with the computer at facility 36 which formats the digitized facsimile image of the transaction voucher 40' into a protocol which is compatible to that of the computer at ACH 38. A program executed at or by the ACH computer analyzes the digitized document and extracts therefrom the amount, account, signature and financial institution. These functions can be shared by the facility 36 and ACH 38 by agreement between them. The ACH computer verifies that the party B account number is valid and that the credit/debit balance of party A is sufficient to cover the amount designated on the transaction voucher 40'. The ACH computer directly or via facility 36 transmits a "procedure interrupt-end of message" code to the facsimile machine 30 of payor. The operator of the machine 30 is signaled to pick up the telephone handset connected on-line with the facsimile machine 30, and a digitally synthesized voice, transmitted by the ACH computer, instructs the operator to enter his personal identification number (PIN) via the touch tone key pad of the telephone. The ACH computer interprets these digits in a conventional manner using touch tone decoder interface (not shown) and verifies that the PIN is correct.

If the PIN is correct, a voice synthesized message generated by the ACH repeats to party A the amount and account information he entered on his voucher, and also informs the party A of the actual name of the business or individual associated with the account number of party B. If this information is correct, party A is asked to depress the asterisk (*) key of his keypad to confirm the transaction or the pound (#) key to cancel the transaction. If some of the information is not interpretable by the ACH Computer, the synthesized voice message requests retransmission of the voucher 40. If the party A confirms the transaction, the facsimile machine 30 returns to an automatic mode after the operator hangs up the telephone handset. A transaction pending confirmation report is then printed out on the facsimile 30 to the party A, detailing the data in the transaction, and indicates its pending status.

Party B, the receiver or "payee" of the funds being transferred by party A, completes the same steps as outlined above. As soon as the ACH computer receives the completed transaction authorization from both parties, the computer will send both parties by facsimile a "transaction pending" confirmation, and thereafter, possibly the next day, will send to the parties a "transaction completion" statement confirming transfer of funds from the account of party A into the account of party B.

If party A and party B are engaged in a voice conversation on another telephone line, and both submit their transaction vouchers simultaneously, the "transaction completion" statement will be printed out immediately after the "transaction pending" confirmations to the parties are printed by the facsimiles 30 and 32. Each "transaction completion" statement contains a summary of all transaction data for both parties associated with the transaction. Each party accordingly will have, upon completion of a transaction, three documents, namely, the original transaction voucher 40, the transaction pending confirmation and transaction completion statement.

Periodically, a statement of account for party A and another for party B are transmitted to the parties by ACH computer. These statements detail all the account activities that have transpired for the parties during a particular time frame, along with account balances and various account charges and credits, as determined by the ACH.

Figure 5:
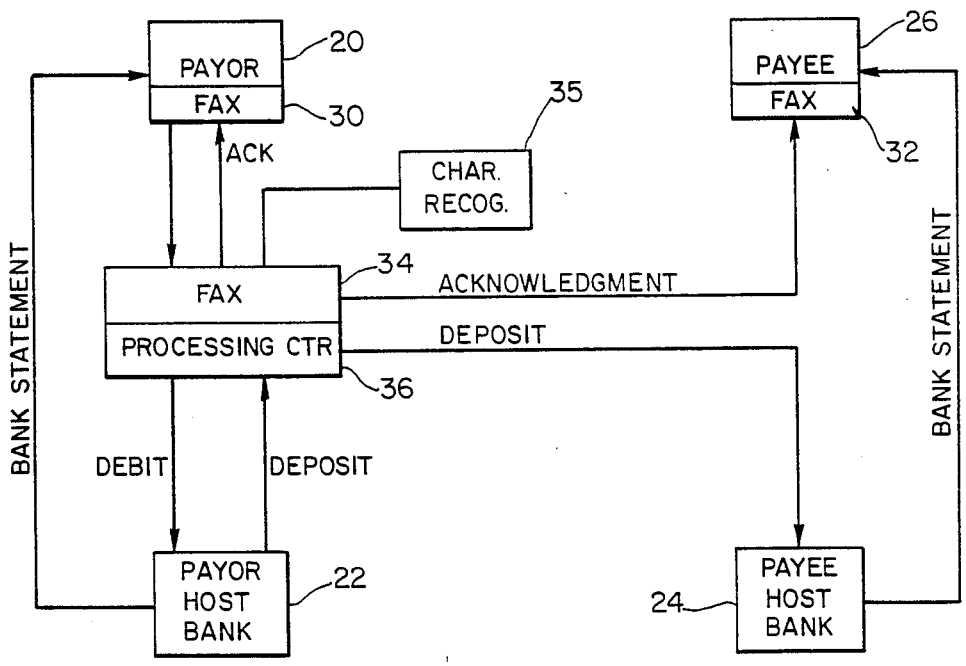
FIGS. 5(a)–5(k) are a flow chart showing programming of the central computer at the ACH for carrying out the principles of the invention.
Figure 5A:
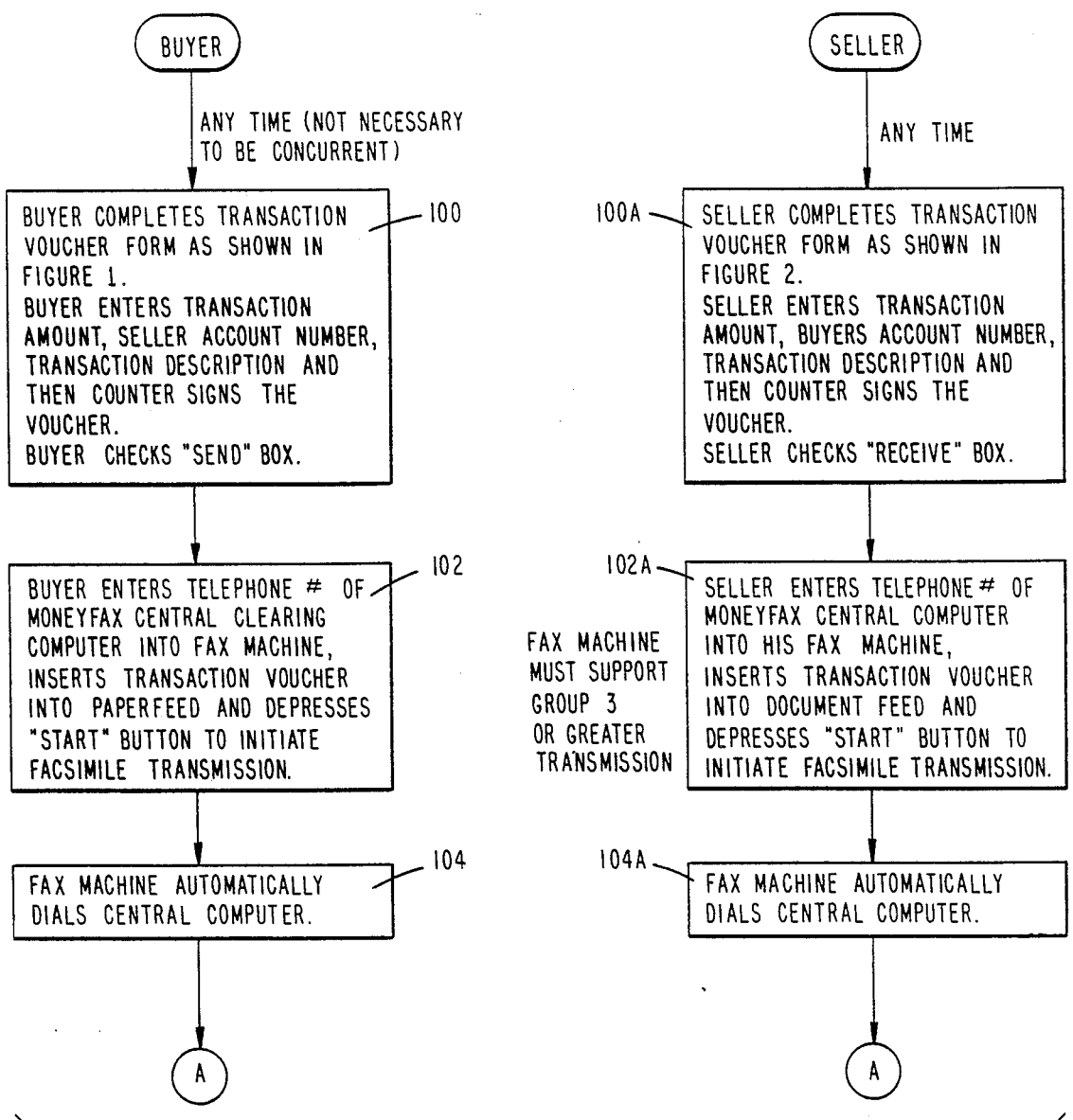

Operation of the system shown in FIG. 1 shall now be described with reference to the flow chart set forth in FIGS. 5(a)-(k) outlining a purchase transaction. In FIG. 5(a), the blocks on the left hand portion describe the sequence of the events that takes place from the standpoint of a buyer (payor), and those on the right hand portion describe the events from the standpoint of a seller (payee). The two sequences, i.e., of the buyer and seller, can take place simultaneously or non-simultaneously; the transaction is deemed to be completed after both sequences have been carried out. However, for the purpose of this discussion, it will be assumed that the buyer and seller sequences will take place approximately simultaneously. It also shall be assumed that the transaction voucher of FIGS. 2a, 2b, i.e., preprinted voucher 40, without identification card pocket 55, is used to carry out a purchase transaction.

Referring now to FIG. 5(a) in detail, the buyer initially completes transaction voucher 40 as shown in FIG. 2a, entering a transaction amount, the account number of the seller, a transaction description and then countersigns the voucher (step 100). The buyer fills in the "send" box in the upper portion of the voucher. Meanwhile, in step 100A, the seller completes his transaction voucher 40 by entering the transaction amount, the account number of the buyer, a description of the transaction, and countersigns the voucher in the region provided. The seller checks the "receive" box at the upper portion of the voucher.

The buyer, in step 102, manually enters the telephone number of the central computer of the central facility 36 or the like, into his facsimile machine 30. He then inserts the transaction voucher 40, now completed, into the document reader of his facsimile machine 30 and presses the "start" button to initiate a facsimile transmission. Similarly, in accordance with step 102A, the seller enters the same telephone number of the central facility 36 into his facsimile machine 32, inserts the transaction voucher 40 into the document reader of the machine and depresses the "start" button to initiate a facsimile transmission. Each facsimile machine 30 and 32 automatically dials the central computer at 36 (steps 104, 104A).

Figure 5B:
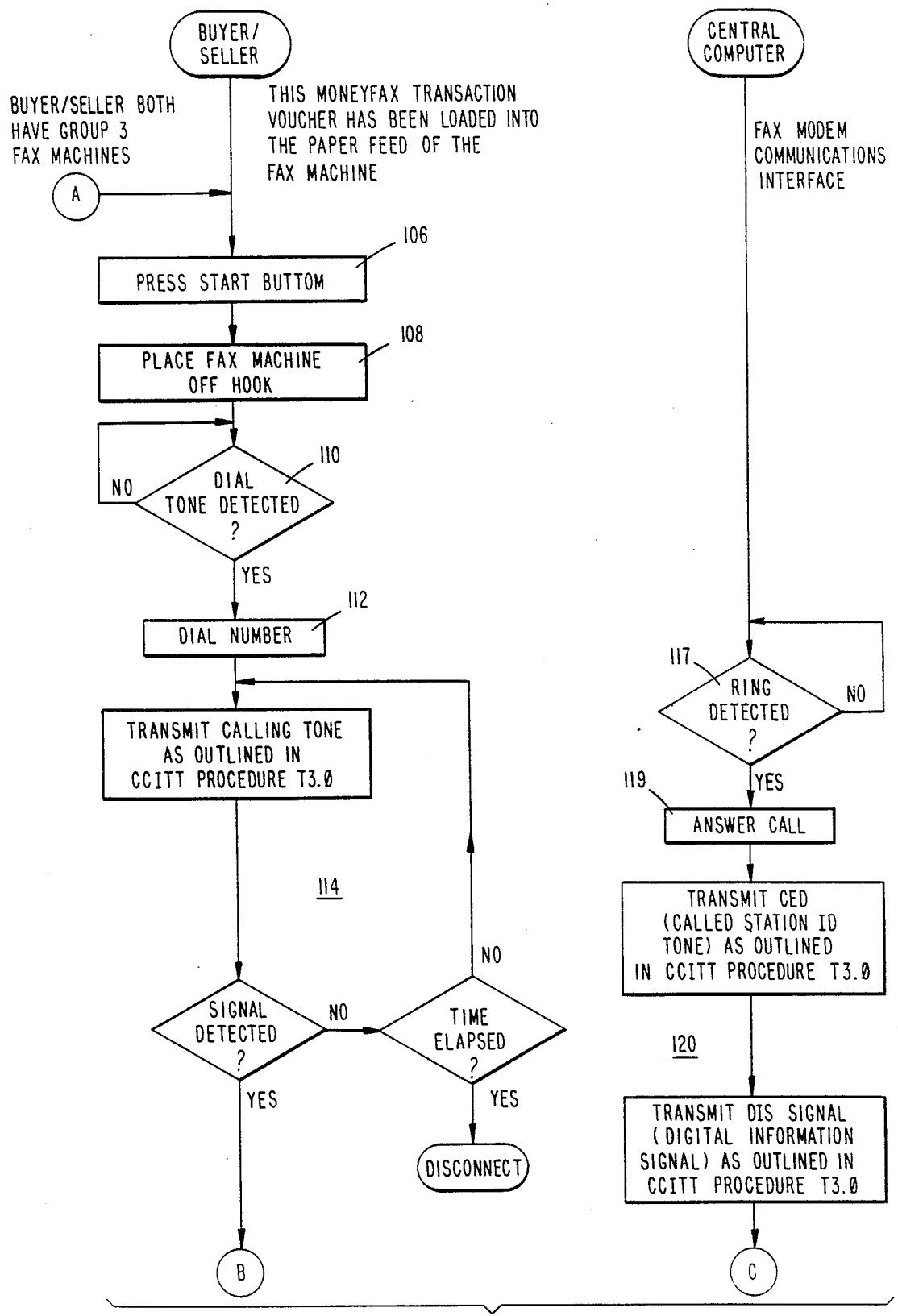
Figure 5C:
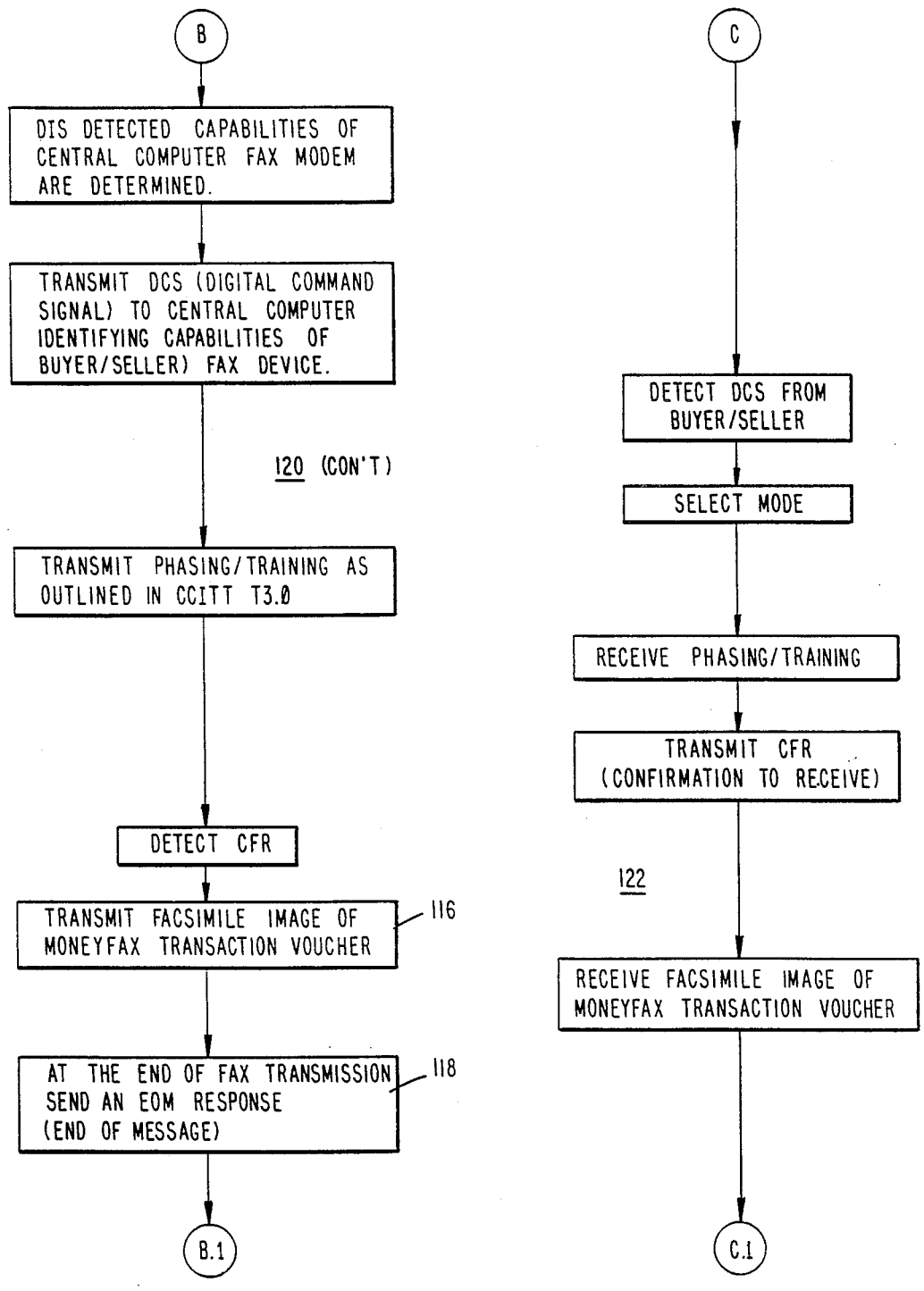
Figure 5D:
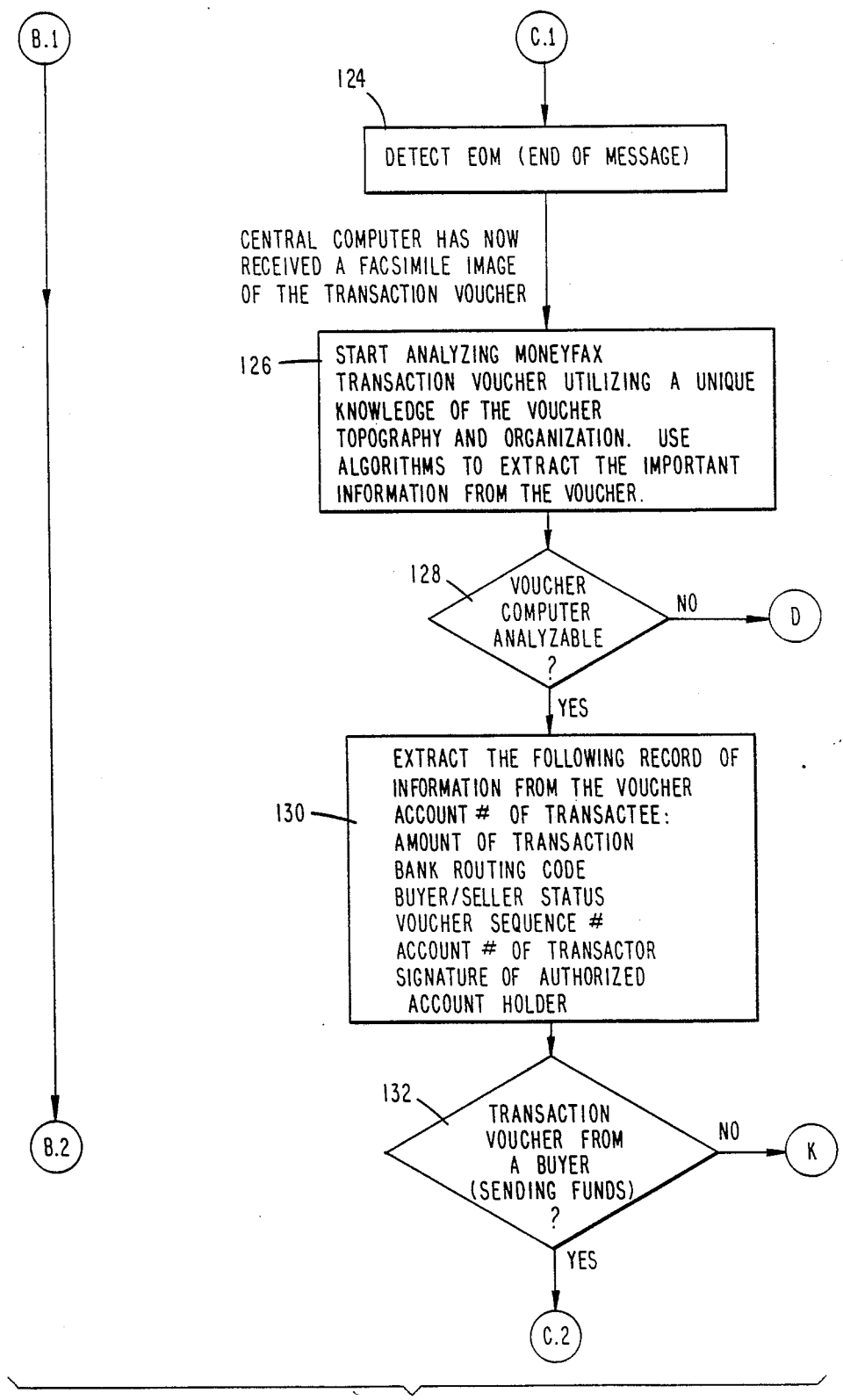

The buyer and seller operation sequences now converge at step 106 in FIG. 5(b) to carry out dialing, with each facsimile machine 30, 32 going off hook (step 108). Assuming that a dial tone is detected (step 110), the telephone number of the central computer at facility 36 is dialed (step 112) and required CCITT protocol between the facsimile machines 30, 34 and the facsimile machine 34 at the central computer is carried out (step 114). In FIG. 5(c), the facsimile image of the voucher 40 is transmitted to facility 36, by bit mapping (step 116), until the end of the document is detected (step 118).

Meanwhile, referring again to FIG. 5(b), the central computer at facility 36 has detected (step 117) and answered (step 119) the incoming telephone call from facsimile machine 30, 32 and has carried out the required CCITT protocol (step 120). The facsimile machine 34, at the central facility 36, thus is enabled to receive the facsimile image of the transaction voucher 40, as provided in step 122 of FIG. 5(c), until the end of the document is detected (step 124 in FIG. 5d).

The image of the received transaction voucher 40 next is analyzed by conventional character recognition software, at the computer of the central facility 36, or optionally at the ACH 38, based upon programmed recognition of the topography of the voucher to extract relevant information therefrom (step 126). Assuming that the voucher is analyzable, as determined during step 128, the following information from the voucher 40 is extracted by step 130.

Figure 5E:
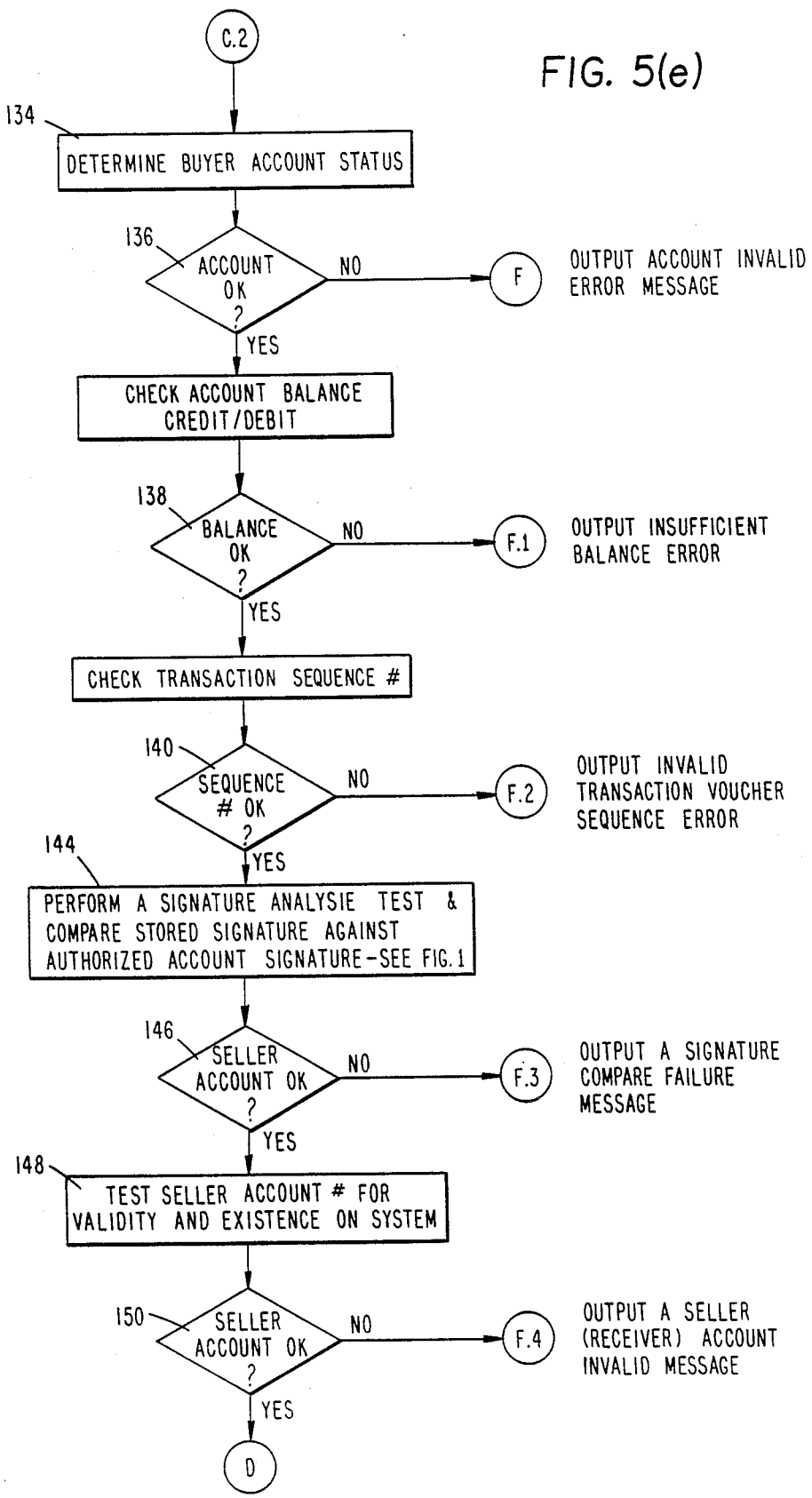
Figure 5F:
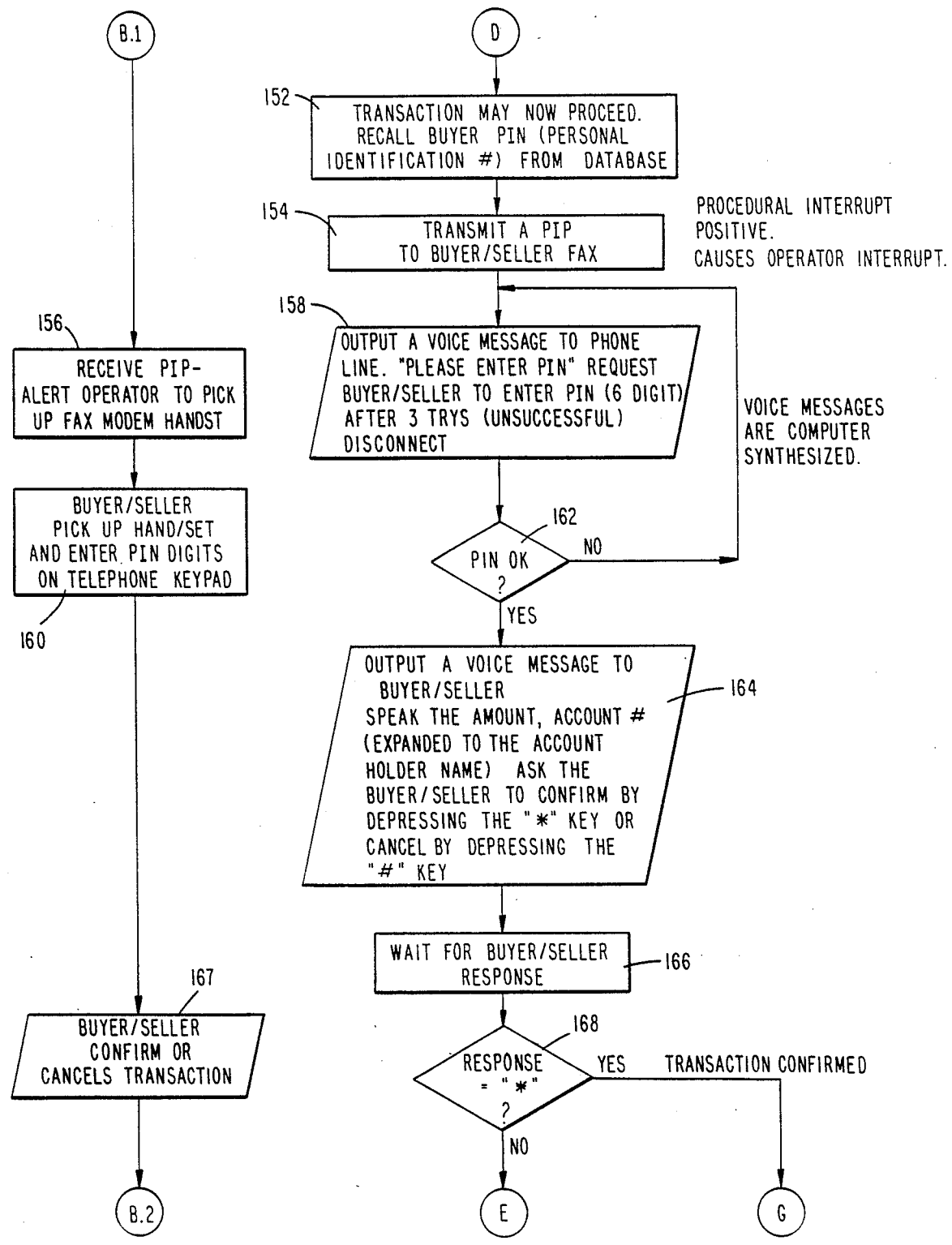

Account number of transactee
amount of transaction
bank routing code
buyer/seller status
voucher sequence number
account number of transactor
signature of authorized account holder If the voucher is from a buyer, the status of the buyer is analyzed in step 134, FIG. 5(e). If the account is not valid, for any reason as determined in step 136, the program jumps to branch 220 in FIG. 5(k) for setting an account flag error message. However, assuming that the status of the account is approved in step 136, the balance is read to determine whether it is sufficient to support the transaction (step 138). If the balance is insufficient, the program jumps to branch 222 of FIG. 5(k), setting an appropriate error message flag. If the balance is sufficient, on the other hand, the transaction sequence number is read from the voucher (step 140). If the sequence of the voucher is determined to be out of order, an error message flag is set at branch 224 of FIG. 5(k). However, assuming that the voucher 40 is sequenced in the proper order, the written signature is analyzed, using conventional signature analysis software (step 144). If the signature is not approved, in step 146, branch 226 sets an error message flag; otherwise, if the signature is approved, the account number of the seller is tested for validity and existence within the system (step 148). If the account number of the seller is determined to be invalid, step 150, the program at branch 228 sets an error message flag. However, assuming that the account number of the seller is valid, as determined in step 150, the program continues to step 152 in FIG. 5(f).

Figure 5G:
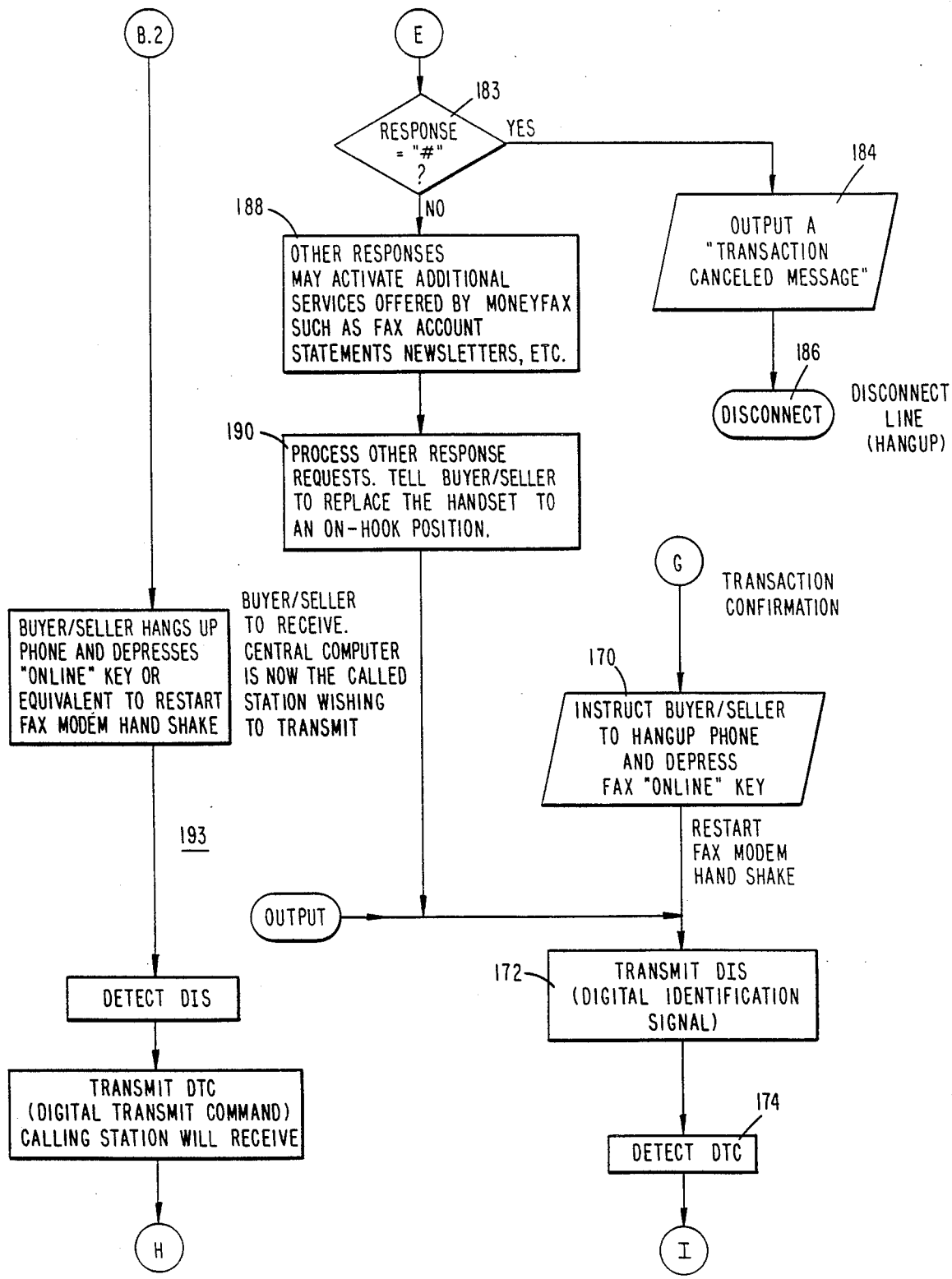
Figure 5H:
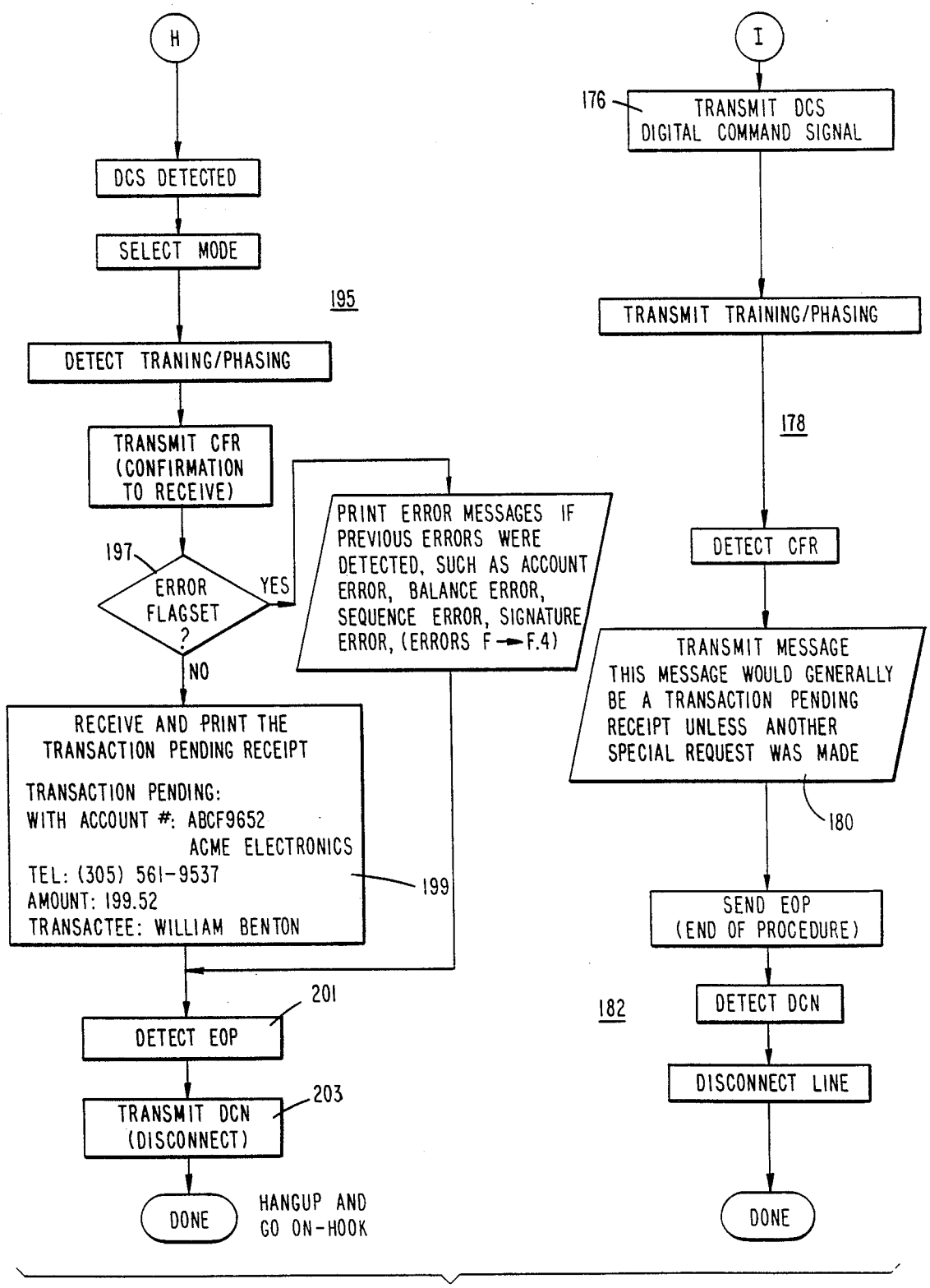
Figure 5I:
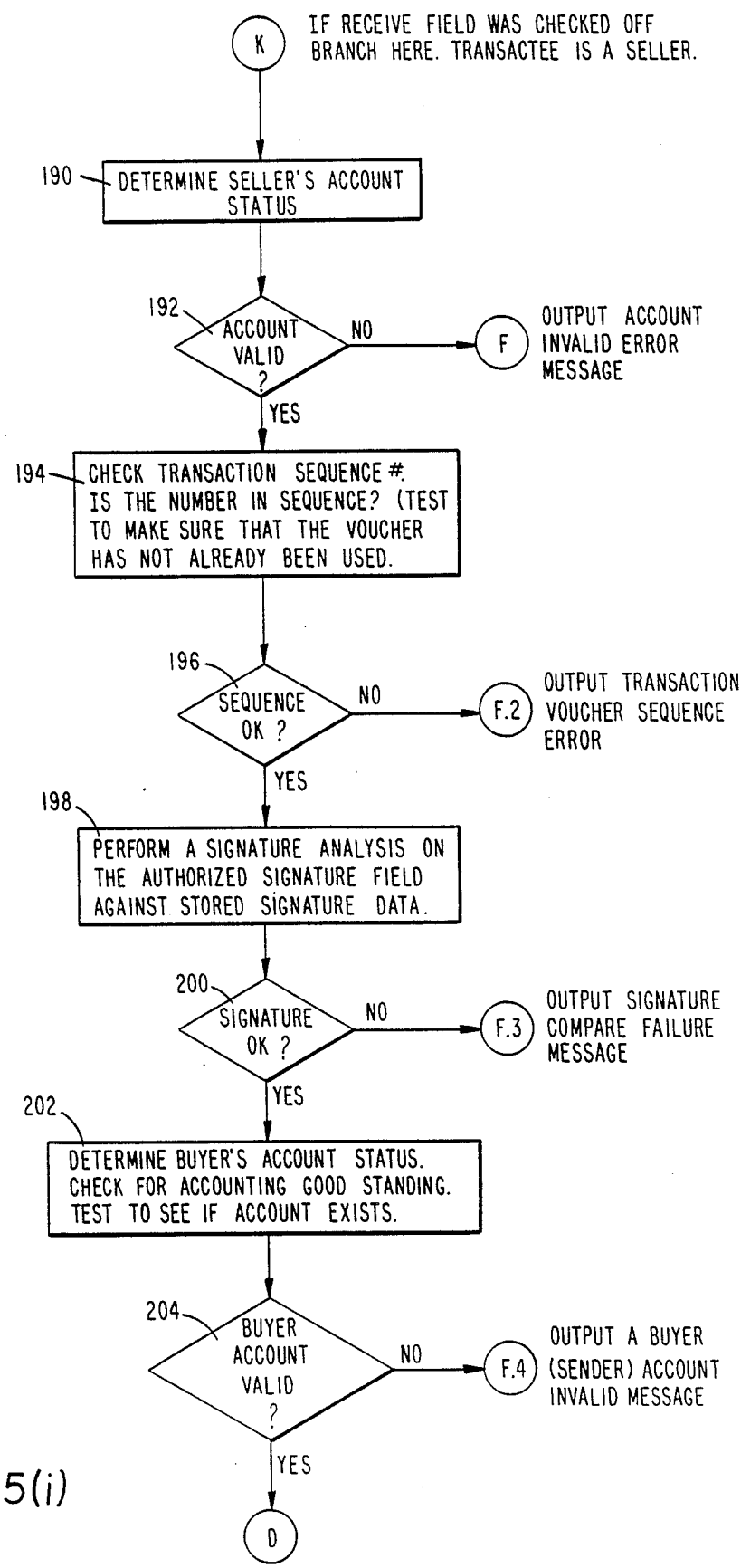

If, on the other hand, the voucher is determined in step 132 to be from a seller, the program in step 190, FIG. 5(i), analyzes the account status of the seller. If the account is valid (step 192), the sequence number of the voucher is checked in step 194. If the voucher appears in proper sequence, step 194, signature analysis on the signature field is made based upon stored signature data (step 198). If the signature is approved, in step 200, the account of the buyer is next checked to ensure that it exists and is in good standing (step 204). If so, the program returns to step 152, FIG. 5(f). Any negative results as a result of tests in step 192, 196, 200, 204 set the appropriate error message flags in branches 220, 224, 226, 228, respectively.

In step 152 the personal identification number (PIN) of the buyer is read from a database of customer account information. A "procedural interrupt positive" (PIP) is transmitted from the central facility to facsimile machines 30, 32 of the buyer and seller (step 154). The PIP alerts the operators at the buyer and seller facsimiles to pick up the modem handset (step 156). A voice synthesized message generated by the computer at the central facility 36 is sent to the buyer/seller, instructing the operator to enter his or her personal identification number (step 158). The buyer and seller pick up their handsets and enter the digits of their personal identification numbers on telephone keypads (step 160), and the digits, received by the central facility, are tested to determine whether the entered personal identification number of each is correct (step 162).

The central facility now transmits a voice synthesized message (step 164) to the buyer and seller, reciting the amount, account number and other necessary information, and requesting the buyer and seller to confirm the transaction by pressing the asterisk (*) key or to cancel the transaction by pressing the "pound" (#) key (step 164). The central computer awaits the responses (step 166). If a response received is an asterisk (*) (step 168), the buyer/seller is instructed to place the facsimile machine on-line in step 170, in FIG. 5(g). A digital identification signal is transmitted by the facsimile machine of the buyer/seller (step 172) and is received (step 174) and detected by the central facility. A digital command signal (DCS) in step 176, FIG. 5(h) is transmitted by the central facility back to the facsimile machine of the buyer/seller, and following required CCITT protocol (step 178), the central facility transmits a facsimile message back to the facsimile machine of the buyer/seller, forming a transaction pending receipt (step 180). Finally, at the end of the document, the facsimile machines are disconnected from each other (step 182).

However, if in step 168 the response received is not an asterisk (*) indicating that the transaction is not confirmed by the buyer/seller, the program continues to step 183, FIG. 5(g) wherein receipt of the (#) key is tested. If a (#) is received, a "transaction cancelled" message is sent to the facsimile machine of the buyer/seller (step 184), and the telephone line is disconnected (step 186). Otherwise, other messages may be sent to the buyer/seller (step 188), and the buyer/seller is instructed to hang up (step 190), following some "handshaking" prior to going on-hook (steps 172-182).

Meanwhile, in steps 193 and 195, FIGS. 5(g) and 5(h), respectively, the facsimile machines 30, 32 of the buyer and seller have been undergoing additional "handshaking" with the facsimile machine 34 at the central facility 36. Any error conditions previously detected in branches 220-228 of FIG. 5(k) are now transmitted to the facsimile machine of the buyer/seller for printing (step 197). If no error message flag is set, a "transaction pending" statement or receipt, having contents shown in step 199 of FIG. 5(h), is transmitted via facsimile to the buyer/seller. When the end of the transaction sending receipt is transmitted (step 201), the facsimile machine 34 at facility 36 goes on-hook (hangs-up), in step 203.

Figure 5J:
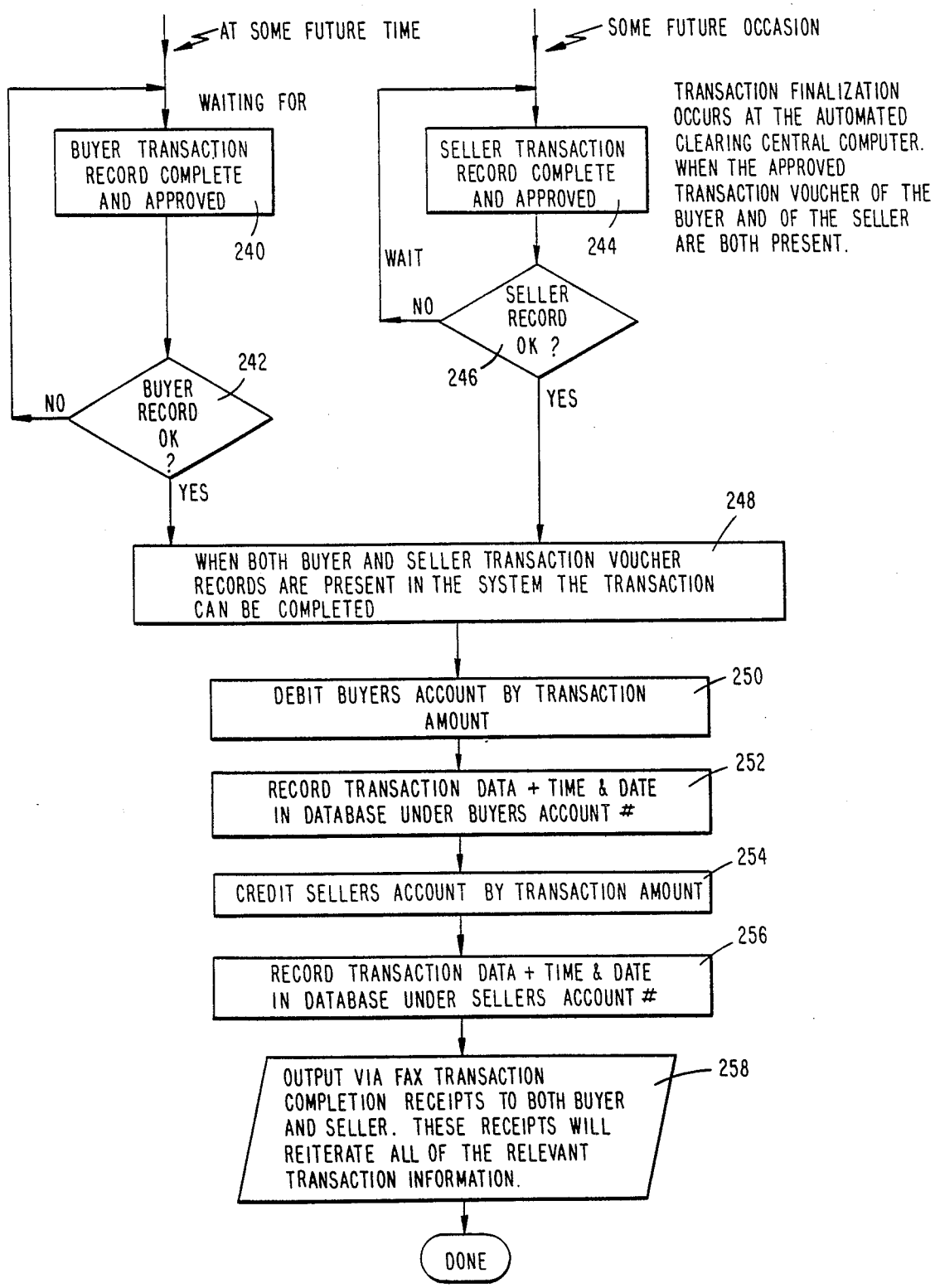
Figure 5K:
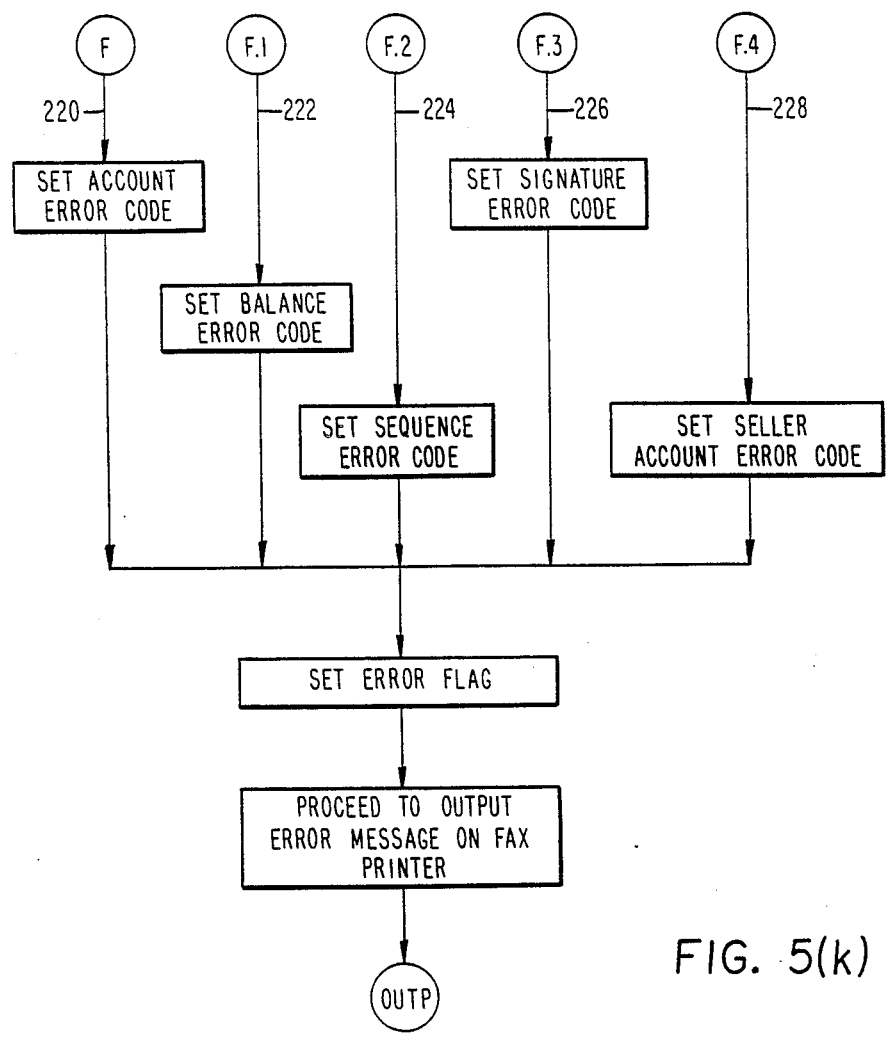

Referring to FIG. 5(j), assuming that the buyer transaction has been completed and approved, in step 240, and further assuming that the buyer's record is acceptable (step 242), i.e., not flagged by the facility 36, and making similar assumptions for the seller (steps 244, 246), the transaction can now be completed by the ACH (step 248). The account of the buyer is debited by the amount of the transaction, in step 250, and the transaction amount and other data, as well as time and date under the buyer's account number, are recorded in the database (step 252). The seller's account is credited by the amount of the transaction, in step 254, and similarly transaction data, time and date under the seller's account are also stored in the database (step 256). Transaction completion statements, or receipts, are now transmitted, in step 258, both to the buyer and seller via their facsimile machines 30, 32. These receipts reiterate all of the relevant transaction information characterizing the transaction.

Figure 6:
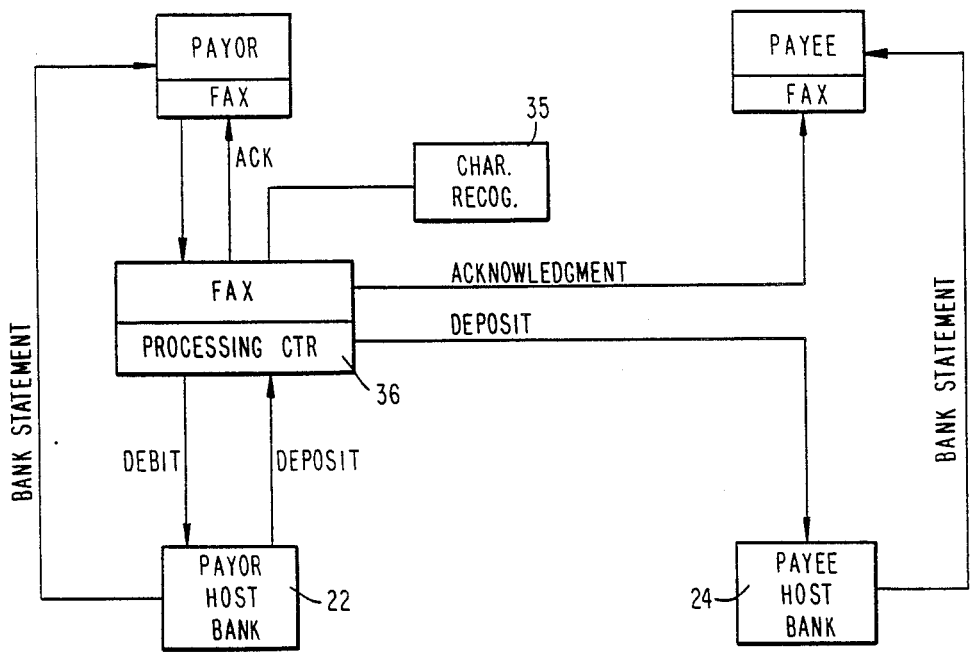
FIG. 6 is a block diagram showing another embodiment of the invention wherein electronic funds transfer is carried out between banks directly, without an intervening ACH.

FIG. 6 shows another embodiment of the invention wherein electronic funds transfer, via facsimile machines, as carried out directly between banks of the payor and payee, without a separate automatic clearing house (ACH). In this embodiment, a central processing system 36 is on-line directly with payee host bank 24 and payor host bank 22, with facsimile machines 30 and 32 with payor and payee on-line with the central processing center, directly.

CONCLUSION

There has been described a method of and system for transferring funds, on-line, between accounts using facsimile machines that are conventional and unmodified. This is made possible by special vouchers, pre-printed with identification of the authorized user and his account data, or adapted to receive, in a transparent pocket portion, a separate identification card. Facsimile machines at the sites of the buyer and seller transmit images of the voucher to a central processing facility that may be part of, cooperative with, or independent of, an automated clearinghouse (ACH), the latter case being, for example, an ABA ENTREE type network. Transaction reports are sent to payor and payee almost immediately during and following completion of the transaction, to enable the parties to determine, virtually in real time, account status. This is highly desirable in a commercial transaction, notifying each sender by facsimile that the account of the receiver of funds has been credited and the senders account debited by the amount of the transaction.

Although facsimile machines at the sites of both the buyer and seller are described hereinabove, it is to be recognized that the system requires only a facsimile at the site of the sender. In this example, the voucher of the sender would contain information necessary only to identify his originating depository financial institution as well as the receiving depository financial institution. Funds in this way can be transferred to the bank account of a student, for example, with confirmation received by the sender immediately; this is an improvement over the prior art wherein notification will arrive later by telephone.

Processing of a personal identification number for safeguarding, described above, is optional This is because unlike checks, the voucher based transactions of the invention cannot be completed unless the accepting party submits a mirror image voucher with the account number of the sending parties. Both parties must have established accounts in the system and must have also established, to obtain an account, some prior determination of credit worthiness and integrity.

The system described herein has substantial utility for individuals without checking accounts. There is a need for persons without checking accounts occasionally to pay utility bills at the last minute, under threat of service cutoff. In this regard, vouchers 40 could be sold by convenience stores to be sent to utility companies. Small fees for the vouchers could be negotiated both for the voucher and for the utility company, due to its inherent saving in labor. The voucher in this environment could be optically digitized at the point of transaction and converted into an ACH compatible detail record within the facsimile machine. This would eliminate considerable processing overhead, decrease communications lines charges. Optionally, an ASCII record representing the voucher in detail, rather than the bit mapped document image, could be transmitted using dial-up modem communication rather than a specialized facsimile interface at a central computer site.

In this disclosure, there is shown and described only the preferred embodiment of the invention, but, as aforementioned, it is to be understood that the invention is capable of use in various other combinations and environments and is capable of changes or modifications within the scope of the inventive concept as expressed herein.

What is claimed is:

1. An electronic funds transfer system for carrying out financial transactions between parties to a transaction, comprising:
   at least one remote facsimile machine at the site or sites of the parties to the transaction, each said facsimile machine including a document reader, a modem for transmitting an image of said document and receiving document images received thereat, and a document printer for printing incoming images on a recording medium;
   a central facsimile machine located at a central facility for receiving incoming images sent from said at least one remote facsimile machine at the site or sites of said parties, a central computer at said central facility and means for formatting said incoming images into a form recognizable by said central computer;
   a transaction voucher having a first region for containing at least the amount of a transaction, an account number and the written signature of a party to the transaction;
   images of transaction vouchers sent by the at least one remote facsimile machine to said central facsimile machine being formatted and processing by said central computer; and
   means incorporated in the central computer for clearing the transaction based upon said incoming voucher images received from said at least one remote facsimile machine.

2. The system of claim 1, including identification cards carried by the parties, each said card including an account number and the identification of a user authorized to carry out transactions, together with his or her signature;
   and wherein said voucher contains a second region for receiving the identification card of an authorized party.

3. The system of claim 2, wherein the second region of the transaction voucher contains a transparent pocket for releasably retaining said identification card therein.

4. The system of claim 1, including voice synthesizer means at the central facility responsive to transaction data incoming from the at least one remote facsimile machine for transmitting voice messages to the parties.

5. The system of claim 1, wherein the central computer includes error detection means for detecting errors in the incoming voucher images and means responsive to the error detection means for controlling the voice synthesizer means for transmitting voice error messages to the parties 6. The system of claim 1, wherein the central computer further includes means for storing personal identification numbers (PINs) of parties authorized to carry out financial transactions, and means for comparing personal identification numbers provided by the parties with the stored personal identification numbers to determine whether the parties are authorized.

7. The system of claim 1, wherein the central computer further includes means for storing account data associated with parties authorized to carry out financial transactions, and means for comparing the amount of a requested transaction with the stored account data to determine whether a requested transaction is authorized.

8. The system of claim 1, including means establishing, via telephone voice communications between the central facility and the parties, means for transmitting from the central facility to the parties a synthesized voice message requesting personal identification numbers, and means for transmitting the personal identification numbers from the parties to the central facility via telephones.

9. The system of claim 8, including means for reading voucher images incoming to the central facility from the parties, means for converting the images to corresponding electrical signals, means for correlating the signals with regions of the vouchers from which the images are obtained and means for transmitting to the parties, via telephone, synthesized voice messages confirming transaction details read from the vouchers 10. The system of claim 1, wherein said central facility comprises an automated clearing house (ACH).

11. A method of carrying out financial transactions between parties in an electronic funds transfer system having remote facsimile machines at the sites of the parties to the transaction, each said facsimile machine including a document reader, a modem for transmitting an image of a document and receiving document images received thereat, and a document printer for printing incoming images on a recording medium; and a central facility having at least one central facsimile machine for receiving images transmitted thereto from remote facsimile machines at the sites of the parties to the transaction, the central facility including a central computer having means for storing account data associated with the parties to the transaction and means for clearing financial transactions based upon the account data and the image data received on-line from parties to a transaction, comprising the steps of:

using the remote facsimile machines, transmitting to the central facility an image of each the transaction voucher having regions containing (1) information indicating whether a party to the transaction is a vendor or vendee, (2) information representing the amount of the transaction, (3) an account number, and (4) the written signature of the vendor or vendee to the transaction; and clearing the transaction based on information contained in the voucher images received by the central facility and on account data stored at the central computer.

12. The method of claim 11, wherein each party carries an identification card having an account number and the identification of a user authorized to carry out transactions together with his or her signature, said method including the additional step of transmitting to the central facility an image of said identification card.

13. The method of claim 11, wherein the voucher contains a transparent pocket configured to receive the identification card, the method including the step of inserting the identification card into the pocket of the voucher prior to using the remote facsimile machine to transmit the image of said voucher to the central facility.

14. The method of claim 11, including the steps of establishing, via telephone, voice communications between the central facility and the parties, transmitting a synthesized voice from the central facility to the parties requesting personal identification numbers, and in response, transmitting the personal identification numbers from the parties to the central facility via pushbuttons of a pushbutton telephone.

15. The method of claim 11, including the steps of reading voucher images incoming to the central facility from the parties, converting the images to corresponding electrical signals, correlating the signals with regions of the vouchers from which the images are obtained and transmitting to the parties, via telephone, synthesized voice messages confirming transaction details read from the vouchers.

16. The method of claim 11, including sending by facsimile from the central facility to the parties a summary record of a completed transaction.

17. The method of claim 11, including sending by facsimile from the central facility to the parties a summary record of transaction activity during a particular period of time.

18. The method of claim 11, including sending by facsimile from the central facility to the parties a summary record of a pending transaction.

19. The method of claim 11), wherein said central facility comprises an automated clearing house (ACH).

* * * * *